(12) United States Patent
McPhee

(10) Patent No.: US 6,273,117 B1
(45) Date of Patent: Aug. 14, 2001

(54) PRESSURE REGULATOR

(75) Inventor: Charles J. McPhee, Huntington Beach, CA (US)

(73) Assignee: I-Flow Corporation, Lake Forest, CA (US)

(*) Notice: Subject to any disclaimer, the term of this patent is extended or adjusted under 35 U.S.C. 154(b) by 0 days.

(21) Appl. No.: 09/350,955

(22) Filed: Jul. 9, 1999

(51) Int. Cl.[7] ................................................. G05D 16/06
(52) U.S. Cl. .................... 137/12; 137/14; 137/505.41; 137/903
(58) Field of Search ................. 137/505.41, 505.42, 137/903, 12, 14

(56) References Cited

U.S. PATENT DOCUMENTS

| | | |
|---|---|---|
| 714,143 | * 11/1902 | Carlson ................... 137/505.41 X |
| 3,547,427 | 12/1970 | Kelly et al. . |
| 3,552,431 | * 1/1971 | Schmidlin ................ 137/505.42 |
| 3,603,214 | 9/1971 | Murrell . |
| 3,747,629 | 7/1973 | Bauman . |
| 3,825,029 | 7/1974 | Genbauffe . |
| 4,074,694 | 2/1978 | Lee . |
| 4,537,387 | 8/1985 | Danby et al. . |
| 4,621,658 | 11/1986 | Buezis et al. . |
| 4,744,387 | 5/1988 | Otteman . |
| 5,141,022 | 8/1992 | Black . |
| 5,732,736 | 3/1998 | Ollivier . |

FOREIGN PATENT DOCUMENTS

| | | |
|---|---|---|
| 479042 | 1/1938 | (GB) . |
| 524698 | 4/1955 | (IT) . |

* cited by examiner

*Primary Examiner*—Stephen M. Hepperle
(74) *Attorney, Agent, or Firm*—Knobbe, Martens, Olson & Bear LLP

(57) ABSTRACT

A device for regulating the outlet pressure of a fluid from a valve body, includes a pressure-sensing chamber having a wall formed by a resilient self-restoring diaphragm which is responsive to pressure in the chamber. A valve element connected to the diaphragm controls flow into the chamber. Increased pressure in the chamber decreases the flow into the chamber and decreasing pressure increases flow whereby fluid flow out from the chamber is maintained at a desired pressure. The outlet pressure is adjusted by deflecting the diaphragm in a direction to open the valve while permitting a section of the diaphragm connected to the valve member to remain responsive to the pressure in the chamber.

18 Claims, 1 Drawing Sheet

PRESSURE REGULATOR

FIELD OF THE INVENTION

This invention relates to fluid pressure regulators, and particularly to regulators well suited for controlling the output pressure of elastomeric balloon or mechanical pumps.

BACKGROUND OF THE INVENTION

Pressure regulators that reduce or cut off inlet flow of a fluid when the outlet pressure starts to exceed a predetermined maximum and that open or increase flow when the outlet pressure has been sufficiently reduced are well known in the art. Such regulators generally include a coil spring that biases a valve member open, and a pressure-sensing element responsive to excess inlet pressure which closes the valve member. In this arrangement, increasing liquid pressure compresses the spring to force the valve member towards a valve seat. As the valve member approaches the valve seat, liquid flow through the regulator becomes more restricted. When the defined pressure level is reached, the valve member contacts the valve seat to cut off flow. When the output pressure drops below the defined pressure, the valve member moves away from the valve seat and flow resumes. This cycle is rapidly repeated over and over to maintain the output pressure at the desired setting.

Numerous pressure regulating devices teach the use of a coil spring, such as U.S. Pat. No. 3,412,650 by Stang, U.S. Pat. No. 3,547,427 by Kelly, U.S. Pat. No. 3,603,214 by Murrell, U.S. Pat. No. 3,747,629 by Bauman, U.S. Pat. No. 3,825,029 by Genbauffe, U.S. Pat. No. 4,074,694 by Lee, U.S. Pat. No. 4,621,658 by Buezis et al., U.S. Pat. No. 4,744,387 by Otteman, U.S. Pat. No. 5,141,022 by Black, and U.S. Pat. No. 5,732,736 by Ollivier. However, a need exists for a pressure regulator device without a spring coil, thereby resulting in a more reliable device with fewer parts which is easier to assemble and costs less.

SUMMARY OF THE INVENTION

An object of this invention is to provide a simplified pressure regulator having fewer parts thereby making it easier to assemble, less expensive and less likely to break. Instead of having the traditional springs located above and below a flexible diaphragm, a resilient diaphragm is employed that by itself controls input flow and regulates output pressure. The diaphragm is made of an elasticomeric material, and is designed not only to act as a diaphragm but to replace the pressure sensing spring and the valve seat spring.

Preferably, the diaphragm is manufactured to be flat, however, after installation into the regulator, an adjuster is moved to deflect the diaphragm. The amount of deflection corresponds with the desired outlet fluid pressure. The diaphragm resists deflection when outlet pressure is less than the desired level, but flexes towards a closed position when the outlet pressure exceeds this level. Thus, this diaphragm uniquely has the additional advantage of functioning as a spring without having any of the disadvantages.

BRIEF DESCRIPTION OF THE DRAWINGS

These and other features of the present invention will be better understood by reference to the following detailed description when considered in conjunction with the accompanying drawing wherein.

DETAILED DESCRIPTION OF THE PREFERRED EMBODIMENT

Figure 1:
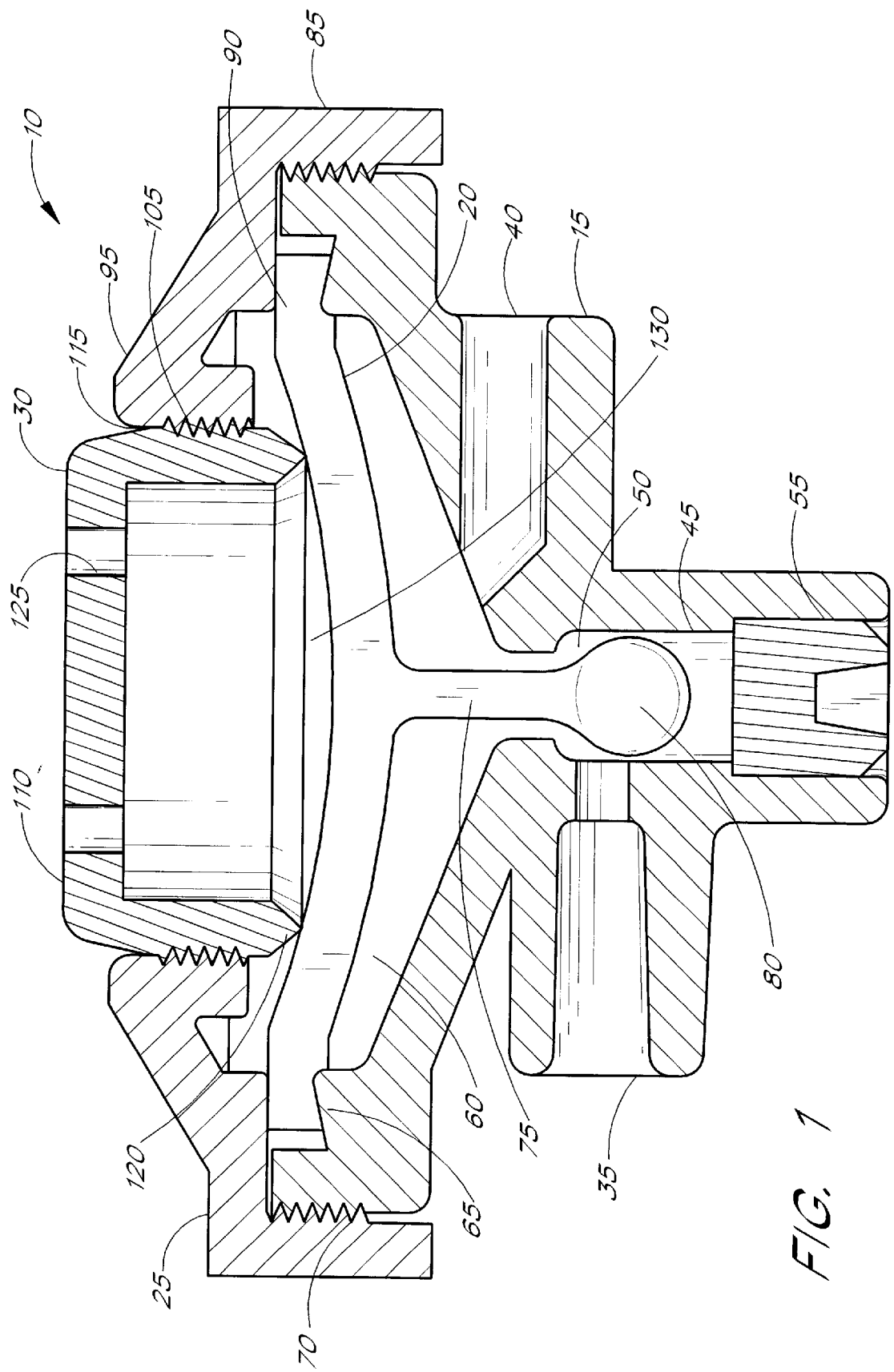
FIG. 1 is a cross-sectional view of a preferred embodiment of the invention.

Referring to the drawings, the pre-set pressure regulator, indicated generally by the numeral 10, comprises a base 15, a resilient wall or diaphragm 20, a retainer 25, and an initial adjuster in the form of a cap 30. The base 15 has an inlet 35 where fluid is introduced into the regulator 10 and an outlet 40 where the fluid exits at the desired pressure. A central, axial passage 45 extends through the base 15, and is in fluid communication with the inlet 35. The diameter of the open end at the top of the passage 45 which is smaller than the lower portion forms a valve seat 50. A plug 55 closes the lower end of the passage.

The top surface of the base 15 is concave and forms the lower boundary of a fluid pressure-sensing chamber 60. The perimeter of the top surface of the base member has an angled, annular shoulder 65 which defines a seating and gripping surface for the diaphragm 20. The shoulder 65 has an externally threaded lip 70 which mates with interior threads on the retainer 25, which is generally ring shaped. The outlet conduit 40 in fluid communication with the chamber 60 extends from the top surface of the base 15 to an exterior surface of the base 15.

The diaphragm 20 is a generally circular, preferably generally flat member which has an outer annular portion clamped between the base shoulder 65 and a flat annular surface 90 on the retainer 25 to seal that area. This causes the bottom surface of the diaphragm to form the upper boundary of the pressure-sensing chamber 60. The diaphragm is preferably made of an elastomeric material, such as silicone so that it will be responsive to fluid pressure changes in the chamber 60 and has a significant "memory" so that it is self-restoring. Depending from the diaphragm 20 is an integral valve stem 75 which extends axially through the chamber 60 and into the passage 45. A valve element 80 on the lower end of the valve stem is positioned in the passage 45 to cooperate with the valve seat 50. The valve element is preferably ball-shaped as illustrated, but may be in the form of a disk or other suitable shape that will properly mate with the valve seat. During assembly, the valve element 80 may be lubricated with alcohol to enable it to be pushed through the valve seat into the passage 45.

The retainer 25 may be ultrasonically welded to the base 15 if desired. An annular area 95 of the retainer 25 slopes upwardly, and inwardly to an interiorly threaded collar 105, which is part of the retainer. The adjuster cap 30 has a flat upper wall 110 and a cylindrical flange 115 extending downward into the collar 105. The exterior surface of the flange 115 is threaded to mate with the threads of the collar 105. The cap 30 is adjusted so that its lower annular end 120 contacts the top surface of the diaphragm 20. The circular, central section of the diaphragm, which is bounded by the lower annular end 120 of cylindrical flange 115 is responsive to fluid pressure in the chamber 60. The loading by the adjusting cap 30 pushes the diaphragm 20 downward, thereby unseating the valve element 80, as shown in the drawing. The adjuster may also be in sliding or cam-like engagement with the retainer.

The upper surface of the diaphragm 20 and the initial adjusting cap 30 form an upper interior space 130 that is separated from the pressure-sensing chamber 60 by the diaphragm 20. Vents 125 extend through the flat surface 110 of the adjusting cap 30 to prevent pressure build-up in the upper interior space 130, and to facilitate turning the adjuster cap 30 when setting the desired outlet pressure.

The base 15, plug 55, adjusting cap 30, and retainer 25 are preferably made of polyvinyl chloride, but may be made of other durable, inexpensive materials known to those of ordinary skill in the art.

When the diaphragm 20 is assembled within the pressure regulator 10, between the angled shoulder 65 of the base 15 and the flat surface 90 of the retainer 25, the valve member 80 is seated in a sealed closed position. After a pressure source is attached to the inlet 35, the cap 30 is advanced against the diaphragm causing the lower annular end 120 flange 115 to deflect the diaphragm 20, thereby unseating the valve element 80 from the valve seat 50. While the valve element 80 is unseated, fluid travels through the inlet 35 and the valve seat 50, flows into the fluid sensing chamber 60, and out through outlet 40. The cap is adjusted until the desired outlet pressure is attained. For a preset pressure device, a suitable adhesive or the like is applied to the threads at 115 to prevent changes in the output pressure setting.

When the pressure of the fluid in the chamber 60 exerts a force against the bottom of the diaphragm 20 greater than the desired value initially set by the adjusting cap 30, a force imbalance occurs. The force of the fluid in the chamber 60 pushes the resilient central section of the diaphragm 20 upward causing the valve member 80 to move in a flow-reducing or flow stopping direction towards the valve seat 50. When the outlet pressure drops below the desired level, the resilient diaphragm central section moves the valve member 80 away from the valve seat 50 and fluid flow into the chamber 60 increases. The resiliency of diaphragm 20 provides its central section the self-restoring flexibility to respond to the pressure of the fluid in the fluid pressure-sensing chamber 60. Consequently, diaphragm 20 is an active member responsive to pressure changes without the need for a conventional spring.

The valve stem and the valve may be made of the same material as the diaphragm 20 and the valve member 80, and may be made as a one piece unit. However, a valve stem 75 made from a material stiffer than that used to make the diaphragm 20 is better able to maintain a constant pressure over a wider range of input pressures. To increase stiffness and obtain this improved effect, a rigid pin (not shown) may be inserted into the valve stem 75, after the diaphragm 20 is assembled into the valve body but before the adjusting cap 30 is installed. Alternatively, the cross section of the valve stem 75 may be increased over part or all of its length to increase stiffness. Further, the valve stem may be a completely separate part that links a separate valve element to the diaphragm.

The pressure regulator is useful in many applications but is particularly suited to control the output pressure of elastomeric balloon or other mechanical pumps.

What is claimed is:

1. A pressure regulator control device comprising:
   a valve body having a fluid inlet, a fluid outlet, a fluid pressure-sensing chamber, and a valve seat in fluid communication with said inlet and defining an opening into said chamber;
   a resilient member forming a wall of said chamber which is responsive to pressure in said chamber and which is self-restoring;
   a valve stem connected to said member and extending through said chamber towards said valve seat;
   a valve element supported on said valve stem and cooperating with said valve seat, said valve element being located between the valve seat and said fluid inlet;
   adjuster mounted to said valve body in position to deflect said member and move the valve element away from the valve seat while a portion of said resilient member connected to said stem flexes in response to pressure changes within said chamber to control the position of the valve element with respect to the valve seat;
   wherein said valve body includes a base incorporating said inlet said outlet, and said valve seat; and
   a retainer mounted atop said base, said retainer having an aperture for receiving said adjuster.

2. The device of claim 1, wherein said resilient member is a flexible generally flat diaphragm prior to assembly to said body.

3. The device of claim 1, wherein said member is a diaphragm which resiliently holds said valve element sealed to said valve seat, but is deflected away from said valve seat by said adjuster.

4. The device of claim 3, wherein said valve body includes a base and a retainer which retains the diaphragm to the base.

5. The device of claim 4, wherein a peripheral edge of the diaphragm is sealingly clamped between said retainer and said base.

6. The device of claim 1, wherein said adjuster includes a portion which engages said resilient member to deflect the member towards the valve seat while a section of the member surrounded by said adjuster portion is free to flex in response to fluid pressure changes in the chamber.

7. The invention of claim 1, wherein said stem is stiffer than the resilient member.

8. A pressure regulator control device comprising:
   a base having a wall forming a wall of a fluid pressure-sensing chamber, said base further including a fluid inlet in communication with a valve seat opening to the chamber, and a fluid outlet in communication with said chamber;
   a flexible, resilient diaphragm forming a wall of said chamber;
   a retainer clamping an annular peripheral portion of said diaphragm between the base and the retainer;
   a valve element mounted to a central section of said diaphragm cooperating with said valve seat in a manner such that increasing pressure in said chamber moves the valve element in a valve closing direction and decreasing the pressure in the chamber moves the valve element in a valve opening direction; and
   an adjuster threadably connected to said retainer and having a flange which engages said diaphragm so as to deflect the diaphragm towards the valve seat, said flange defining a central section of said diaphragm which is movable in response to fluid pressure within said chamber.

9. A method of regulating fluid pressure comprising the steps of:
   preventing the flow of a fluid through a valve seat into a fluid pressure chamber, utilizing a flexible resilient diaphragm forming a wall of said chamber, when said diaphragm is not mechanically deflected;
   deflecting a self-restoring section of said diaphragm to introduce fluid into said fluid chamber;
   flexing said self-restoring section in response to pressure changes within said chamber;
   controlling the flow of fluid through said valve seat into said chamber with a valve element mounted to move in response to the flexing of said diaphragm section in a manner such that increasing the pressure in said chamber moves said valve element towards said valve seat and decreasing the pressure in said chamber moves said valve element away from said valve seat;

allowing fluid to flow from said chamber to an outlet in said valve body; and adjusting the pressure by adjustably deflecting said diaphragm in a manner to control the flexing of said diaphragm section to obtain a desired outlet pressure.

10. A method of regulating outlet pressure of a fluid passing through a valve body comprising the steps of:

providing a pressure-sensing chamber in said valve body with a resilient self-restoring wall of said chamber that is responsive to the fluid pressure in the chamber;

providing a valve element connected to said resilient wall in such a manner that said valve element is held in a closed position with respect to a valve seat so that the flow of fluid into said pressure responsive chamber is prevented;

mechanically deflecting said wall to move said element into a position allowing the flow of fluid into said pressure responsive chamber; and controlling the flow of fluid into said pressure responsive chamber by way of said valve element connected to said resilient wall in a manner to increase fluid flow into said chamber when pressure in said chamber decreases and to decrease flow into said chamber when the pressure in said chamber increases, thereby controlling the pressure of fluid flowing out of said chamber.

11. The method of claim 10, including the step of adjusting said outlet pressure by deflecting said resilient wall in a manner to control the pressure in the chamber causing the wall to move the valve.

12. The method of claim 11, wherein said adjusting step includes deflecting said wall in a direction to move said valve element in a direction to increase flow into said chamber, while allowing a section of said wall to remain responsive to the pressure in said chamber for controlling further movement of said valve element.

13. The method of claim 12, wherein said valve element is connected to said wall central section by way of a valve stem, and said adjusting step includes deflecting said central section in a valve opening direction with an adjuster which deflects said central section while permitting said central section to flex in response to pressure changes within said chamber.

14. A pressure regulator comprising:

a valve body having a fluid inlet, a fluid outlet, a fluid pressure-sensing chamber, and a valve seat in fluid communication with the inlet and defining an opening into the chamber;

a resilient member forming a wall of said chamber which is responsive to pressure in said chamber and which is self-restoring;

a valve stem connected to said member and extending through said chamber towards said valve seat;

a valve element supported on said valve stem and cooperating with said valve seat, said valve element being located between said valve seat and said fluid inlet;

wherein said valve body, said resilient member and said valve stem are configured such that said valve element is sealed against said valve seat when said resilient member is not mechanically deflected.

15. The regulator of claim 14, wherein said valve body further comprises an annular surface, said resilient member supported on said annular surface such that said surface defines a first diaphragm portion radially inward from said annular surface.

16. The regulator of claim 15, further comprising an adjuster adjustably mounted relative to said resilient member and configured to assume a first position engaging said resilient member and causing said valve element to be disengaged from said valve seat.

17. The regulator of claim 16, wherein said adjuster defines a second diaphragm portion when in said first position, said second diaphragm portion being responsive to changes in pressure within said fluid chamber.

18. The regulator of claim 15, wherein said adjuster is configured to assume a second position in which said adjuster does not engage said resilient member.

* * * * *